United States Patent [19]
Bates et al.

[11] Patent Number: 5,251,482
[45] Date of Patent: Oct. 12, 1993

[54] LOW FREQUENCY ACOUSTIC FUEL SENSOR

[75] Inventors: Kenn S. Bates, Long Beach; David B. Chang, Tustin, both of Calif.

[73] Assignee: Hughes Aircraft Company, Los Angeles, Calif.

[21] Appl. No.: 552,642

[22] Filed: Jul. 16, 1990

[51] Int. Cl.$^5$ .................. G01F 17/00; G01F 23/28

[52] U.S. Cl. ..................... 73/290 V; 73/149

[58] Field of Search .............. 73/147, 290 V, 597, 73/111, 149; 181/123, 124; 364/562, 556, 571.01, 571.03, 499; 367/902, 908; 324/636

[56] References Cited

U.S. PATENT DOCUMENTS

| | | | |
|---|---|---|---|
| 3,075,382 | 1/1963 | Mathias | 73/149 |
| 3,237,451 | 3/1966 | Haeff | 73/290 V |
| 3,266,311 | 8/1966 | Andreasen et al. | 73/290 V |
| 3,324,716 | 6/1967 | Roberts | 73/149 |
| 3,834,233 | 9/1974 | Willis et al. | 73/290 V |
| 4,640,130 | 2/1987 | Sheng et al. | 73/579 |
| 4,677,305 | 6/1987 | Ellinger | 73/290 V |
| 4,704,902 | 11/1987 | Doshi | 73/290 V |
| 4,811,595 | 3/1989 | Marciniak et al. | 73/290 V |
| 4,991,433 | 2/1991 | Warnaka et al. | 73/290 V |

FOREIGN PATENT DOCUMENTS

| | | | |
|---|---|---|---|
| 2417734 | 11/1974 | Fed. Rep. of Germany | . |
| 3005851 | 9/1981 | Fed. Rep. of Germany | 73/290 V |
| 3933116 | 4/1990 | Fed. Rep. of Germany | . |
| 0110918 | 8/1980 | Japan | 73/290 V |
| 0090215 | 7/1981 | Japan | 73/290 V |
| 165719 | 7/1988 | Japan | 73/149 |
| 298013 | 12/1988 | Japan | 73/149 |
| 1176175 | 8/1985 | U.S.S.R. | 73/149 |
| 2199948 | 7/1988 | United Kingdom | 73/290 V |
| 02001 | 6/1983 | World Int. Prop. O. | 73/149 |

OTHER PUBLICATIONS

E. W. Pike et al, "Investigation of Fuel Quantity Measuring Techniques," DTIC-AD712120, USAF-AMC Wright Patterson AFB, Ohio, Jun. 1952.

W. B. Engle and R. M. Owen, "Electrical and Physical Nature of Microbial Membranes Implicated in Aircraft Fuel Quantity Probe Malfunction," SAE-710439, National Air Transportation Meeting, Atlanta, Ga., May 1971.

J. Huddart, "An Alternative Approach to Fuel Gauging," SAE-790138, Society of Automotive Engineers, Detroit, Mich., Feb./Mar. 1979.

E. Suzuki, T. Tomoda, and S. Momoo, "A Highly Accurate Fuel Level Measuring System," SAE-871961, Passenger Car Meeting, Dearborn, Mich., Oct. 1987.

P. Weitz and D. Slade, "Effects of Anti-Static Additives on Aircraft Capacitance Fuel Gauging Systems," AFWAL Wright Patterson AFB, Ohio, Technical Report #AFWAL-TR-80-2058, Jun. 1980.

K. Wantanabe and Y. Takebayashi, "Volume Measurement of Liquid in a Deformed Tank," SAE-8/1964, Passenger Meeting, Dearborn, Mich. Oct. 1987.

H. Garner and H. Howell, "Volumetric Fuel Quantity Gauge," Patent Application, NASA-CASE-Lar-131-47-1, Aug. 1984.

J. J. Singh, G. H. Mall, D. R. Sprinkel and H. Chegini, "Feasibility of a Nuclear Gauge for Fuel Quantity Measurement Aboard Aircraft," NASA-TM-87706, Aug. 1985.

B. D. Keller, C. R. Mayer and B. Blanter, "Acoustic Fuel Quantity Measurement System," NADC-781-87-60, NADC Warminster, Pa., Feb. 1980.

*Primary Examiner*—William A. Cuchlinski, Jr.
*Assistant Examiner*—W. Morris Worth
*Attorney, Agent, or Firm*—Georgann S. Grunebach; Terje Gudmestad; Wanda K. Denson-Low

[57] ABSTRACT

An acoustic fuel (or other liquid, powder or solid) sensor is disclosed. The sensor measures the volume of fuel in a container of known size. The air within the container is excited by an acoustic transducer. The transducer is driven by a frequency scanning source, and the frequency response of the air cavity within the container is monitored. This frequency response is then processed to determine the volume of air in the container, and the fuel volume is determined to be the total container volume less the air volume. In one embodiment, a tube connects the transducer through an orifice to the air volume, and the frequency response is observed to determine the resonant frequency of the air cavity within the container. The volume of the air cavity is then determined from the resonant frequency. The volume of the fuel is then determined from the tank volume minus the volume of the air cavity.

8 Claims, 3 Drawing Sheets

LOW FREQUENCY ACOUSTIC FUEL SENSOR

BACKGROUND OF THE INVENTION

The present invention relates to volume measuring sensors, and more particularly to a sensor for measuring the volume of air present in a container or a tank, thereby providing an indication of the volume of a liquid, powder or solid occupying the remaining volume of the container.

Several factors have come to the fore in recent years to suggest that a new design for a fuel quantity gauge is becoming a necessity. With the advent of consumers desiring smaller automobiles, designers would like the flexibility of employing convoluted fuel tanks to achieve space efficiency. This will necessitate a change from the simple fuel level gauges in use today.

Consumers, having voiced their desire for longer and more inclusive warranties, are getting such from automobile manufactures. As a consequence, manufacturers are looking for methods to lessen repair costs wherever possible. Presently if an automobiles is brought in for repair because of a defective fuel gauge, the entire fuel tank is replaced. The cost of dissecting the old fuel tank and repairing the gauge is prohibitive. Manufacturers would like externally mounted or easily removable fuel sensors so that the good fuel tank would not have to be discarded, thereby reducing warranty repair costs.

An unlevel vehicle and/or fuel sloshing contribute sources of error to fuel level gauges. Considering the increasing amount of stops and starts for today's commuting driver, the fuel sloshing could render the fuel gauge inaccurate for a large fraction of the time. This enhances the need for a level and sloshing insensitive fuel quantity sensor.

The new dashboard displays can display a high degree of accuracy in their readouts. So much so, that now the limiting factor in the accuracy of reading the remaining fuel is no longer in the display but in the fuel quantity gauge itself. Car manufacturers would like more accurate fuel gauges.

These four compelling reasons indicate the definite need for a new or improved fuel quantity gauge. An accurate, externally-mounted or removable, fuel volume sensor would provide a solution to all of the problems mentioned above.

The conventional gauges have been used in the measuring of fuel for years. The automobile, with its relatively quiescent journey and limited elevation angle, typically employs the mechanical float sensor. This sensor detects level of fluid in the tank and is inexpensive.

Some airplanes use mechanical float sensors, but most use a cylindrical capacitive sensor. Whichever sensor is used, a matrix of these sensors (from 4 to 12, typically) is typically used within each fuel tank inside the plane. There are several separate fuel tanks within an airplane to take best advantage of this limited space available within a plane's wings and fuselage. This matrix of sensors and averaging electronics is required to allow some measure of accuracy during banking and climbing. The capacitive sensor is also more accurate than the mechanical float sensor and therefore there is less likelihood of running out of fuel. However, the capacitive sensor is more expensive than the mechanical float sensor, making a matrix of such sensors prohibitively expensive for use in automobiles.

A simple mechanical float fuel sensor consists of a float (which always rides at the level of the fuel) and vertical rails which constrain the float. For a reference, see E. W. Pike et al., "Investigation of Fuel Quantity Measuring Techniques," DTIC-AD712120, USAF-AMC Wright Patterson AFB, Ohio, June 1952.

This sensor produces either a changing voltage or current as the float moves up and down along the rails. There have been numerous advances in the mechanical float sensor. However, most mechanical float sensors tend to suffer from the following general disadvantages: (1) Mechanical float sensors require some electricity within the fuel tank. Although not a problem, this is still disadvantageous from a safety standpoint. (2) Mechanical mechanisms of any sort break down with much higher regularity than any other system having no moving parts. (3) Mechanical floats have lower accuracies than other fuel gauges available today. (4) Mechanical float gauges measure only fuel level. This is a disadvantage as fuel sloshing, inclining of the road, and the convoluted fuel tank shapes of today decrease the accuracy of fuel level as a measure of fuel quantity.

Another conventional fuel gauge is the capacitive array fuel gauge. This gauge has been used for years in the fuel tanks of both commercial and military aircraft. For references, see W. B. Engle and R. M. Owen, "Electrical and Physical Nature of Microbial Membranes Implicated in Aircraft Fuel Quantity Probe Malfunction," SAE-710439, National Air Transportation Meeting, Atlanta, Georgia, May 1971; J. Huddart, "An Alternative Approach to Fuel Gauging," SAE-790138, Society of Automotive Engineers, Detroit, Mich., February/March 1979; K. Suzuki, T. Tomoda, and S. Momoo, "A Highly Accurate Fuel Level Measuring System," SAE-871961, Passenger Car Meeting, Dearborn, Mich., October 1987; P. Weitz and D. Slade, "Effects of Anti-Static Additives on Aircraft Capacitance Fuel Gauging Systems," AFWAL Wright Patterson AFB, Ohio, Technical Report #AFWAL-TR-80-2058, June 1980. The main reason that this gauging technique is preferred is because it is employed in an array configuration. By using multiple sensors in a clever array-like arrangement an array gauge can average out any tilting of the fuel tank.

The basic capacitive fuel sensor consists of two coaxial cylindrical electrodes, where the fuel sits between the walls of each cylinder. As the fuel tank fills, the height of the fuel between the electrodes increases. The fuel acts as a dielectric medium, thus altering the overall capacitance of the cylindrical capacitor probe.

The probe can be treated as two parallel capacitors in parallel. The first capacitor is the lower half of the probe, having the fuel dielectric between the electrodes. The second capacitor is the upper part of the probe, having only the air gap between the electrodes. The fuel height is inversely proportional to the dielectric constant of the fuel and directly proportional to the measured capacitance. The disadvantages of this sensor are: (1) the capacitive sensor is an expensive sensor. Arrays of such sensors further increase the cost. (2) The capacitive sensor by nature uses electrical contact in the tank. (3) Microbial growth in the fuel tank has been shown to affect the accuracy of this sensor.

A fiber optic liquid level gauge is described in J. W. Berthold, "Fibre Optic Intensity Sensors," Photonics Spectra, 22(12), 125-138 (December 1988), and utilizes two fibers, a prism, an LED, and a detector. The fiber must be arranged so that the light enters the prism from the first fiber and bounces off of the bottom face at the critical angle for a glass/air interface. The second fiber is for receiving light reflected from the prism. The critical angle is that angle at which no transmitted wave is produced into the second medium. Snell's law governs the angle of the transmitted and reflected waves at an interface. If light in the prism strikes the face at the critical angle, then there will be no transmitted wave and all the light will be reflected into the second fiber. If this is used in a tank and the liquid level comes up to the prism, then the interface is now a glass/liquid one. The transmitted angle is then not 90°, and the transmitted wave exists. The reflected wave will now have less energy than in the previous case. This drop in the intensity of the reflected wave can then be sensed at the detector. Multiple fiber sensors, each of different length, can be employed to provide an incremental level capability. The disadvantages of the fiber optic fuel gauge are: 1) the sensor must be located inside the tank, 2) films can form on the prism and foul the sensor, 3) the fiber optic sensor is a discrete sensor, and 4) the fiber optic sensor is a level sensor only.

There are two techniques associated with another known fuel sensor, the Boyle's Law or pressure fuel quantity gauge. (For references, see: K. Wantanabe and Y. Takebayashi, "Volume measurement of liquid in a deformed tank," SAE-871964, Passenger car meeting, Dearborn, Mich., October, 1987; H. Garner and W. Howell, "Volumetric Fuel Quantity Gauge," U.S. patent application, NASA-CASE-Lar-13147-1, August 1984.) The first technique (the Beckman method) uses isothermal compression to measure the volume of the gas. Any isothermal (constant temperature) change in volume is accompanied by a change in pressure. Measuring this pressure change, as a piston which is connected to the system collapses its volume, yields a measure of the entire tank volume. This technique has one major drawback. It cannot work in a tank that has vent holes or leaks of any kind. Such leaks would not allow the pressure build up that is so critical to the measurement. A second method proposed by Wantanabe and Takebayashi, id., uses an adiabatic (no heat flow) process and a step function of pressure to determine the volume of the air in the tank. This method can deal with small, medium, and large holes in the tank. The effect of leaks in the tank do not alter the outcome of the gauge, they only modify the relaxation time and damping of the pressure pulse in the tank. By noticing the speed of decay of the pressure after the step response, the gas volume can be determined. The disadvantages of this system are (1) the system is bulky and heavy, (2) the adiabatic system requires more complex electronics, and (3) the pistons and valves involved together with the electronics cause this gauge to be very expensive compared to other automobile fuel gauges.

A nuclear decay gauge consists of a nuclear decay source such as Americium (Am) or Krypton (Kr) gas (or an array of such sources) and a detector (such as a Geiger-Mueller tube or solid state radiation detector). For references, see K. V. Pearson, "Nucleonic Fuel Quantity Gauging System," Society of Automotive Engineers, Seattle, November, 1974; J. R. Webster, "Nucleonic Massmetric Instrumentation of Propellants for Aircraft," Air Force Flight Dynamics Laboratory, Wright Patterson Air Force Base, Ohio, Technical Report #AFFDL-TR-70-127, April, 1971; J. J. Singh, G. H. Mall, D. R. Sprinkle, and H. Chegini, "Feasibility of a Nuclear Gauge for Fuel Quantity Measurement Aboard Aircraft," NASA-TM-87706, August, 1985; and D. R. Sprinkle and C. Shen, "A method for monitoring the variability in nuclear absorption characteristics of aviation fuels," NASA-TM-4077, 1988. The source(s) are arranged so that the fuel lies between it and the detector(s). A simple system such as this consists of one source, a rectangular tank and one detector. The disadvantage of this system are (1) the detector and source are expensive, (2) the gauge can probably not be made removeable, and (3) this gauge yields a level measurement only.

The acoustic pipe resonant fuel gauge uses a simple pipe submerged within the fuel standing vertically within the tank, but open at the bottom to allow fuel to fill the tube. A speaker is used to drive standing waves within the open tube. The resonant frequency and therefore the standing wavelength within the tube determine the height of the volume of liquid in the tank. For reference, see B. D. Keller, C. R. Mayer, and B. Blanter, "Acoustic Fuel Quantity Measurement System," NADC-78187-60, NADC Warminster, Pa., February 1980. The resonant frequency of the pipe is determined by whether an odd integral number of $\frac{1}{4}$ wavelengths will exactly fit the space between the speaker and the fuel level. The disadvantage of the acoustic pipe resonant fuel gauge is that it is a fuel level gauge only.

SUMMARY OF THE INVENTION

A low frequency acoustic sensor apparatus is described for measuring the volume of a liquid, powder or solid in a container of known volume, whereby the interior of the container contains a volume of the liquid, powder or solid, and the remaining volume of the container is filled with a gas such as air in an air cavity. The sensor apparatus includes an orifice defined in a wall or the top cover of the container in communication with the cavity. Means are provided for acoustically exciting the gas or air in the container via the orifice over a range of excitation frequencies. This means may include, for example, an acoustic transducer acoustically coupled to the orifice and a frequency scanning excitation signal source for generating the drive signals to the transducer.

The sensor apparatus further comprises means for providing a response signal indicative of the amplitude of the acoustic response of the air cavity within the container to the acoustic excitation signals. This may include, for example, a means for measuring the drive signal current flow to the transducer or a microphone within the tank or sidechamber.

In accordance with the invention, the sensor apparatus further comprises a processing means responsive to the frequency of the excitation signal and the corresponding response signal for providing a liquid volume signal indicative of the volume of liquid in said container. The processing means includes means for determining the volume of air in the container from said response signals and the excitation frequencies, and means for relating the volume of air and the known volume of the container to the corresponding volume of liquid in the container. Thus, the liquid volume is equal to the total container volume less the air cavity volume.

In one preferred embodiment, the acoustic excitation means includes a sidechamber housing, the transducer and an the orifice in the tank that is located between the elements in the sidechamber. In this way, the resonator is driven in parallel to the sidechamber, so that the air cavity is a resonant cavity. The processor then determines the resonant frequency of the cavity, and relates the resonant frequency to the air cavity volume.

In a second preferred embodiment, the acoustic excitation is done via the transducer directly coupled to a tube, and the tube is coupled to the orifice in the tank. The tube length can be quite small, in some cases only the thickness of the tank wall. The tube and orifice form a Helmholtz resonator and the resonant frequency is inversely proportional to the square root of the air volume.

In a third embodiment, the transducer is mounted directly to the orifice, and the acoustic impedance of the air cavity is used to obtain the corresponding air cavity volume.

In a fourth embodiment, a torus-shaped side chamber is coupled to the tank orifice via a small tube, and a fan blows air through the side chamber over an edge tone generator, causing turbulent action to occur. The turbulence generates white noise, stimulating the air in the tank at all frequencies. A microphone picks up the sound, and the signal processor detects the loudest frequency and correlates the frequency to the volume of air in the tank.

BRIEF DESCRIPTION OF THE DRAWINGS

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

According to one aspect of the invention, a volume sensor is provided which exploits the Helmholtz resonator effect to measure the volume of fuel in a tank, e.g., such as a vehicle fuel tank. Although the preferred embodiment is directed to a fuel sensor, it is to be understood that the invention has general application to measuring the volume of gas in a container, and from this measurement inferring the volume of any non-compressible fluid, powder or solid in the container.

Figure 1:
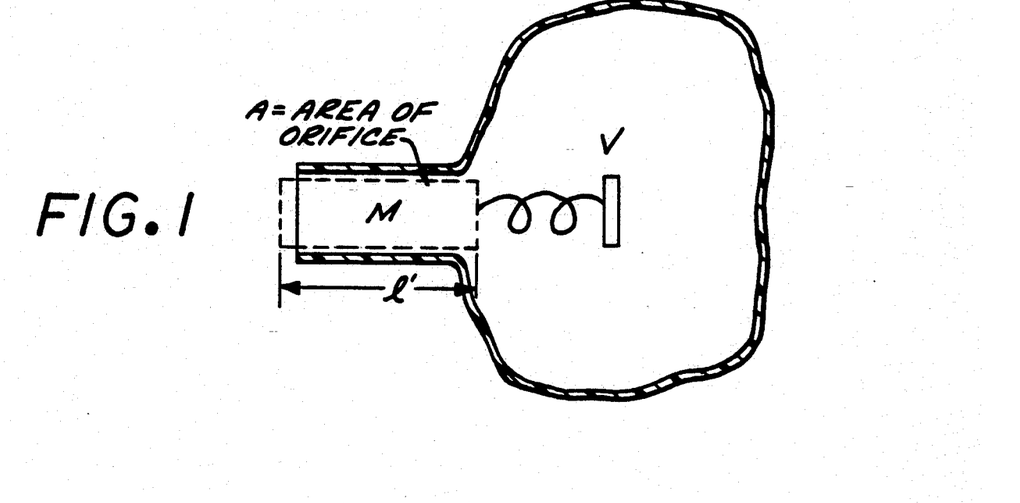
FIG. 1 illustrates a mechanical analogy to the Helmholtz resonator.

The Helmholtz resonator is well known, and is mechanically analogous to a mass and spring oscillating system as depicted in FIG. 1, wherein a tube of length 1 communicates with a volume of air in a tank through an orifice of area A. Here, the mass is that of the plug of air in the tube, and the spring, with spring constant K, is the volume V of air in the tank. The differential equation describing such an oscillating system is set forth as eq. 1.

$$M(d^2x/dt^2)+KX=F \quad (1)$$

$$(-\omega^2 M+K)X=F \quad (2)$$

$$X=F/(-\omega^2 M+K) \quad (3)$$

where for the Helmholtz resonator:
$P_{out}$=pressure outside the resonator orifice
$M=\rho Al'$
$X$=average particle displacement
$K=\rho C^2 A^2/V$
$\rho$=density of gas
$F=\rho_{out} A$
$A$=area of orifice
$C$=speed of sound in air
$l'$=effective length of air plug in the tube (slightly longer than l)
$V$=volume of air in the tube The air plug length is not simply equal to the tube length, because the air surrounding each opening of the tube has an inertia which partially affects the mass of the plug. The added mass, and thus an added length ($\Delta l$), is a function of the radius r, where $\Delta l=0.61$ r. Therefore, $l'=l+(1.22)(r)$.

The resonant frequency occurs when the denominator (eq. 3) vanishes.

$$-\omega_R^2 M+KK=0 \quad (4)$$

Therefore, $$\omega_R = (K/M)^{\frac{1}{2}} \quad (5)$$
$$= ((\rho C^2 A^2/V)/\rho Al')^{\frac{1}{2}} \quad (6)$$
$$= (C^2 A/l'V)^{\frac{1}{2}} \quad (7)$$

The invention determines the resonant frequency of the air volume in the tank to thereby measure the volume of air in the tank. The volume of liquid, power or solid in the tank is the tank volume minus the air volume.

Figure 2:
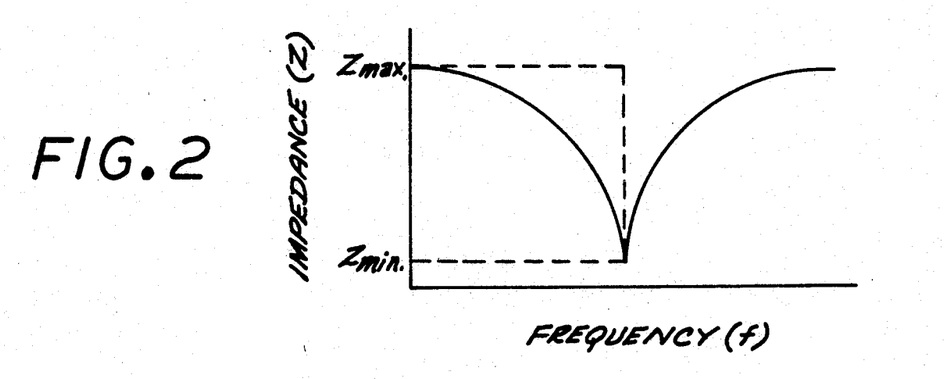
FIG. 2 is a plot of the impedance of the air cavity as a function of frequency for a sensor embodying the invention.
Figure 3:
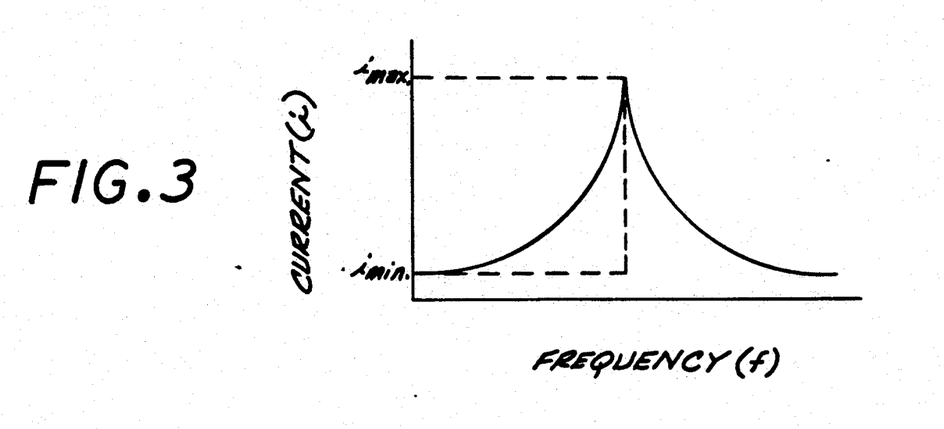
FIG. 3 is a plot of the current through a constant amplitude transducer as a function of frequency for a sensor embodying the invention.

FIG. 2 shows a plot of the impedance versus the exciting frequency for a parallel Helmholtz resonating system. The current (i) versus frequency (f) of a current through a constant amplitude speaker driving a Helmholtz resonating system in series is shown in FIG. 3. (A constant amplitude speaker maintains constant amplitude (when driving a constant load) as a function of frequency.) Of course, a constant amplitude transducer is not required to practice the invention. However, if the transducer used is not "constant amplitude," a correction will have to be made in the form of a calibration curve. A similar speaker driving a constant load in parallel with such a resonator would have a current versus frequency curve similar to the impedance versus frequency curve of FIG. 2. The volume of the air space is given by the resonant frequency $f_o$, i.e., $$V=(C^2 A)/(l'4\pi^2 f_o^2) \quad (8)$$

where C=speed of sound in air, A=the area of the orifice, and l'=the effective length of the plug of air in the tube.

Side Chamber Helmholtz Resonator Sensor

Figure 4:
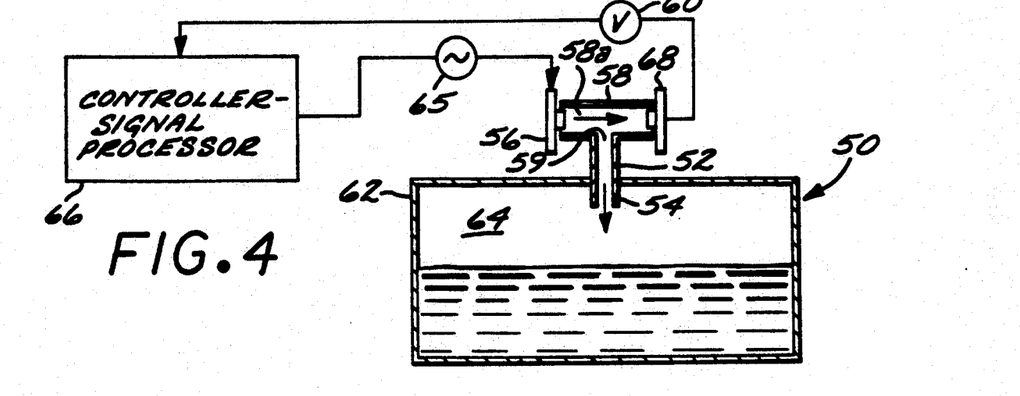
FIG. 4 is a simplified schematic diagram illustrating a fuel volume sensor embodying the present invention.

A liquid sensor 50 embodying the invention is shown in FIG. 4. The sensor 50 includes a first pipe 52 which communicates through an orifice 54 formed in the tank 62 with the air cavity 64. A second pipe 58 is mounted transversely with respect to the first pipe, and forms a sidechamber 58A which communicates with the first pipe 52 via orifice 59.

Means are provided for exciting the cavity 64 with a frequency scanned signal. The exciting means in this embodiment comprises a first transducer 56 such as a speaker and a frequency scanning source, such as a sine wave generator 65 controlled by the controller-signal processor 66 for driving the transducer 56. The first transducer 56 is mounted in a first end of the sidechamber tube 58.

The system 50 further comprises a second transducer 68 for providing electrical signals indicative of acoustic signals incident thereon. The second transducer 68 may comprises a microphone, for example.

The system 50 further comprises an voltmeter 60 for providing a signal indicative of the voltage across the transducer 68. The controller-signal processor 66 processes the voltage signal and determines the resonant frequency of the air space 64 and, from the resonant frequency, the air space volume and liquid volume within the tank 62.

In a particular application, the transducer 56 may take the form of a conventional audio speaker that can work in the lower frequencies of the Helmholtz regime (typically 20 Hz–300 Hz.) The transducer essentially converts electrical drive signals into corresponding acoustic energy. The second transducer 68 may take the form of a microphone, such as the condensor or electret type, that is accurate over the frequency range of interest. For an embodiment wherein the liquid is water, microphones such as the model 4165 sold by Bruel & Kjaer, 1542 E. Katella, Anaheim, Calif. 92805, or the model 7022 sold by ACO Pacific, 2604 Read Avenue, Belmont, Calif. 94002, are suitable for the purpose. For an embodiment wherein the liquid whose level is to be measured is fuel, a microphone that is resistant to the caustic fumes of fuel should be used.

It is not required to employ a separate transducer such as a microphone to record the acoustic response to the excitation signal. For example, a transducer characterized by a low mechanical impedance may be employed as transducer 56. This permits the transducer 56 to sense changes in the load as a function of frequency. The current through the transducer 56 can then be measured to provide an indication of the acoustic response to the excitation signal.

In the system of FIG. 4, the Helmholtz resonator comprises the tank 62 and the short pipe 52 as a side channel off the larger cylindrical pipe 58. A pressure wave is driven along the axis of the large cylindrical pipe 58 via the speaker 56 located on one side. The microphone 68 on the other side of the pipe 58 registers any change in sound wave amplitude with frequency and thus can record the resonant frequency.

The system 50 operates in the following manner. The speaker 56 (driven by device 66) emits a single frequency of sound wave. This wave then propagates along the pipe 58 as indicated by the arrow in FIG. 4. The sound wave divides itself between driving the tank resonator and traveling onward to drive the microphone 68. The speaker sound wave frequency is ramped up incrementally and the process is repeated until the frequency band is exhausted.

The impedance of the Helmholtz resonator of the system 50 can be represented by $Z_H$. The impedance of the microphone is fixed, $Z_M$. Therefore the impedance of the system is:

$$1/Z_T = (1/Z_H) + (1/Z_M) \qquad (8)$$

The system 50 is a parallel system, and therefore the expected voltage amplitude versus frequency curve, as seen at the microphone, will be similar to the impedance versus frequency curve of FIG. 2.

An electronic circuit may then be employed to measure the resonant frequency $f_o$, or a ratio of the transducer voltage at different frequencies to infer the resonant frequency and thereby know the volume of air.

The signal processor 66 thus scans the frequency of the transducer exciting signal over the expected frequency range, and monitors the voltage across the transducer 68 to determine resonance, i.e., the resonant frequency $f_o$ at which the air space 64 resonants. From $f_o$ the volume of the air space is determined. The entire volume of the tank 62 is known and, hence, the liquid volume is equal to the tank volume minus the air space volume. This may be calculated, e.g., by a digital computer.

The typical steps in the operation of the sensor 50 are the following:

1. The controller-signal processor 66 scans the frequency over the Helmholtz frequency regime (approximately 20 Hz to 200–300 Hz).

2. The resonant frequency $f_o$ is detected via the microphone 68 by its low amplitude response over frequency.

3. The controller-signal processor 66 squares the resonant frequency value and converts the resonant frequency into a constant times the air volume. (The constant is determined experimentally).

4. The total tank volume minus the air volume yields the fuel volume.

Alternatively, values for the liquid volume corresponding to a given set of resonant frequencies may be predetermined, and stored in a look-up table to be addressed in correspondence to the resonant frequency signal.

Direct Driven Helmholtz Sensor

Figure 5:
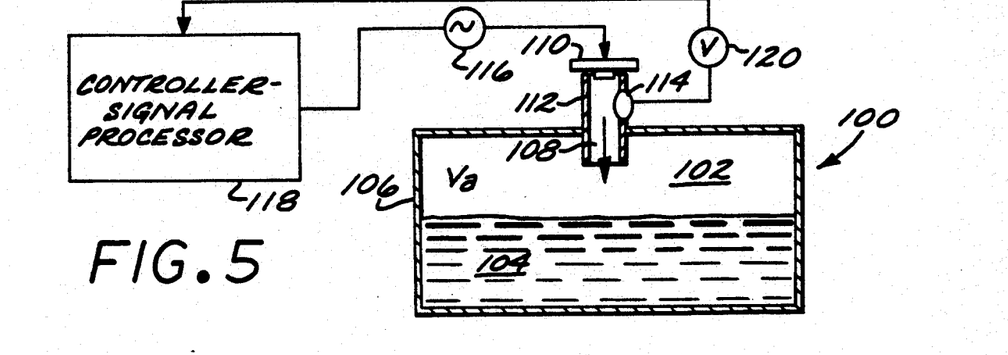
FIG. 5 is a simplified schematic diagram illustrating a first alternate embodiment of a liquid volume sensor employing the invention.

A first alternate embodiment of the invention is illustrated in FIG. 5. The system 100 measures the air space volume $V_a$ in air space 102, and from the air space volume infers the liquid volume $V_f$ in the liquid space 104 within the tank 106. An orifice 108 is formed in the tank 106. A small pipe 112 extends from the orifice 108. The transducer or speaker 110 is mounted at the end of the pipe 112, and is therefore coupled directly to the orifice 108, instead of via a second pipe as in the embodiment of FIG. 4. As in the embodiment of FIG. 4, a frequency scanning source 116 drives the transducer 110. A microphone 114 is responsive to the acoustic energy incident thereon. As in the embodiment of FIG. 4, a controller-signal processor 118 controls the scanning source 116, a voltmeter 120 measures the voltage across the microphone 114, and the processor 118 processes the voltage signal information to determine the volume $V_a$ and liquid volume $V_f$.

The system 100 operates in the following manner. The speaker 110 emits a sound wave at a particular frequency, and the resonator comprising the tank 106 and pipe 112 reponds easily if the frequency is near resonance, sluggishly if it is not. The speaker 110 in this way is scanned over the entire frequency range and the voltage across the transducer 114 is recorded. Because the system 100 is driven in series, a plot of the current versus frequency should look like the plot of voltage versus frequency in FIG. 3. The controller-signal processor can then pick out the resonant frequency by always storing the highest voltage value and its associated frequency and comparing the stored values to the voltage values for the entire frequency band. The resonant frequency is then correlated to the air volume and consequently the fuel volume in the tank.

Edge Tone Sensor

Figure 6:
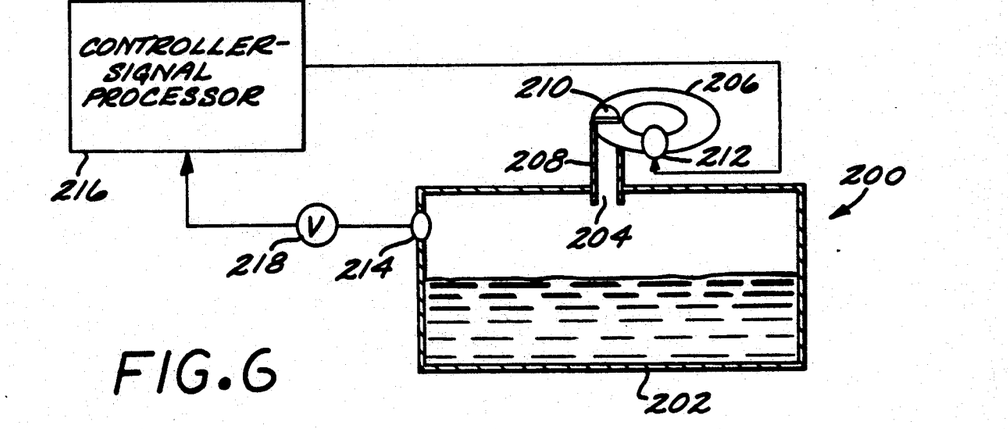
FIG. 6 is a simplified schematic diagram illustrating a second alternate embodiment of the invention.

A second alternate embodiment of the invention is an edge tone system 200, shown in FIG. 6. The system 200 comprises a fuel tank 202, orifice 204, torus-shaped side channel 206 coupled to the orifice 204 by a small pipe 208, an edge tone generator 210, fan 212 and microphone 214. In operation, the fan 212 will blow air over the edge tone generator 210. The edge tone generator 210 is simply a sharp obstruction located in the orifice between the side channel 206 and the small pipe 208. The edge tone generator 210 causes turbulent action to occur. This turbulence generates white noise and thus stimulates the air in the tank 202 at all frequencies. The air in the tank 202 responds best at its resonant frequency. The sound is picked up by the microphone 214. The signal processor 216 detects the loudest frequency and calculates back to obtain the volume of air in the tank.

Acoustic Impedance Sensor

The acoustic impedance of the cavity of air in a closed tank may be used to measure the volume of air 234. The acoustic impedance may be measured using the system 230 shown in FIG. 7. Here, the transducer 232 is mounted directly in the aperture 236 formed in the tank 238. (This differs from the embodiment of FIG. 5 in that no pipe is used to couple the transducer to the cavity.)

Figure 7:
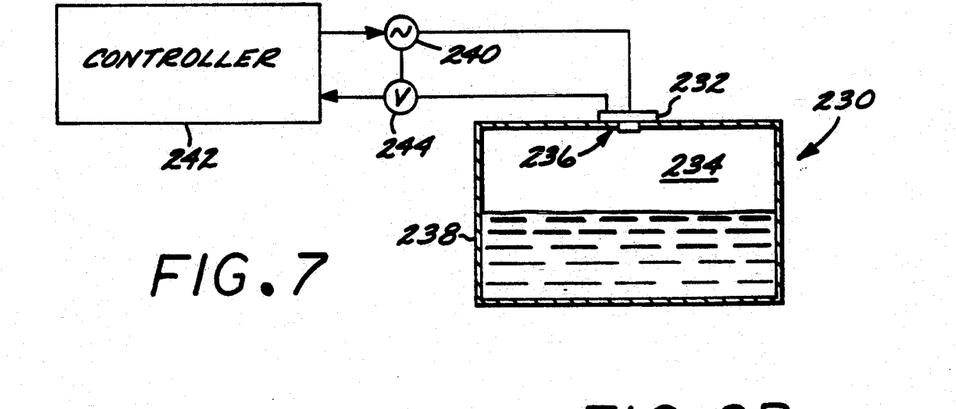
FIG. 7 is a simplified schematic diagram of a third alternative embodiment of the invention.

For a very small aperture area A, the "effective length" of the transducer air plug is approximately 0.61 times the radius of the aperture 236. If the radius is small, this implies a large Helmholtz resonance frequency. If the transducer 232 is operated at frequencies much lower than the resonance frequency, the $-\omega^2 M$ term in the denominator of the expression for transducer displacement (eq. 3) can be ignored, compared to the effective spring constant. In that case, the volume V of vapor in the tank is directly related to the amplitude of the transducer displacement. Another way to see this is to look at the relation between pressure and vapor volume in the tank. Thus, for an essentially "static" situation, $$PV = RT \quad (9)$$

$$\delta(Pv) = (\delta P)V + (\delta V)P = 0 \quad (10)$$

Equation 10 assumes an isothermal system. This gives for the displacement of the transducer, $\delta l$:

$$\delta l = \left(\frac{V^2}{KT}\right)\left(\frac{F}{A^2}\right) \quad (11)$$

where F is the force of the transducer and A is the cross-sectional area of the transducer.

The dependence of the displacement on the volume is quadratic.

The displacement of the transducer can be measured by using a second transducer attached to the same diaphragm, and the displacement can be used to determine the volume. Alternatively, the current can be measured through the transducer 236, and used as inversely proportional to impedance. The volume can be inferred from the impedance by calibrating the instrument at different volumes. Electronics can be used to correlate to the quadratic dependence.

Thus, in FIG. 7 a sine wave generator is controlled by controller device 242 to drive the transducer 232 with a sine wave signal of a frequency much lower than the resonant frequency of the tank. An ammeter 244 provides a signal to the controller 242 indicative of the current flow through the transducer 232. The controller then compares the measured current value to the values stored in a calibration table to determine the volume of air 234 in the tank 238. The calibration table is compiled during a calibration cycle by measuring the current through the transducer 232 as a function of different fuel/air volumes in the tank 238, or by calculating the air volume using eq. 11.

Exemplary Calculation of Resonant Frequency

The example worked out below illustrates the calculation of the resonant frequency of the side chamber resonant system (FIG. 4) with a resonator size of typical vehicle gas tank dimensions. Assume that the main cylinder 58 has a cross-sectional area of 5 square centimeters. The cylinder 58 is driven by a speaker 56 on the one side and the acoustical waves are detected on the other side by a microphone 68. In the center of the cylinder lies a side channel, pipe 52. The analogous electrical circuit is somewhat complex and would require the solving of simultaneous Kirchoff's equations to elucidate all the particulars of the system. However, the calculations can be greatly simplified by employing a knowledge of resonance and what consequences it has in the system.

Figure 8A:
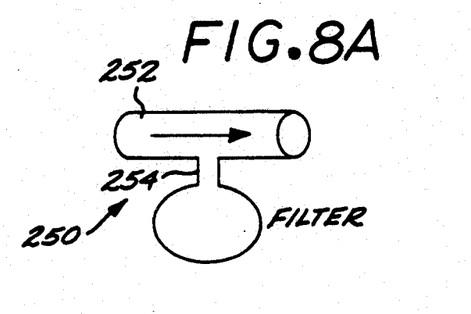
FIGS. 8A and 8B represent schematic drawings of the classic Helmholtz resonator as a filter and its electrical analog.
Figure 8B:
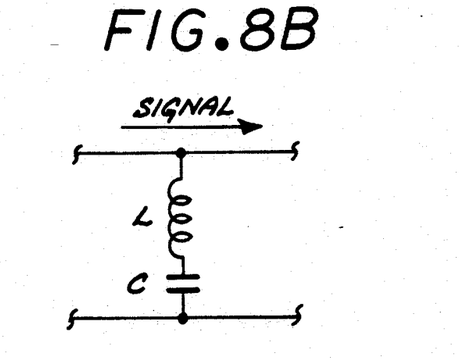

Schematics of the classic Helmholtz resonator filter and its electrical analog is shown in FIGS. 8A and 8B.

The calculation for the resonant frequency for the Helmholtz resonator is given by the formula:

$$f_0 = \frac{\omega_o}{2\pi} = (1/2\pi)(1/(MC)^{\frac{1}{2}}, \quad (12)$$

where M, C are the effective mass of the plug of air and compliance of the volume of air, respectively. Choosing dimensions for the resonator of the area A of the orifice = 4 cm$^2$, l = 0.1 cm and the air volume V = 10 gallons. Then l', M, C can be calculated from:

$$l' = l + 1.22\ r$$

and the resonant frequency comes out as:

$$f_0 = \frac{\omega_o}{2\pi} = 46.3\ \text{Hz}.$$

Calculated minimum and maximum resonance frequencies ($f_{min}$ and $f_{max}$) for a 20 gallon fuel tank that is empty (V = 20 gal, C = 5.42 × 10$^{-7}$ M$^5$/Nt) and almost full (V=0.5 gal, C=1.35×10$^{-8}$ M$^5$/Nt) are as follows for three sets of values of A and l.

| A (cm$^2$) | r (cm) | l (cm) | l' (cm) | M (kg/m$^4$) | $f_{min}$ (Hz) | $f_{max}$(Hz) |
|---|---|---|---|---|---|---|
| 4 | 1.13 | 1 | 2.37 | 69.9 | 25.9 | 163.6 |
| 13.3 | 2.06 | 0.1 | 2.61 | 23.2 | 44.9 | 284.4 |
| 4 | 1.13 | 0.1 | 1.48 | 43.7 | 32.7 | 206.9 |

Therefore the low frequency range would be 24-45 Hz for a completely empty fuel tank. The high frequency range, assuming that 19.5 gallons is the largest (near full) volume that one needs to report, is 150-300 Hz. Transducers and microphones which can measure accurately over this frequency range (24-300 Hz) are readily available.

The resonant frequency of the sensors of FIGS. 4-6 which determines the volume is proportional to the speed of sound in the tank. The speed of sound C is a function of the temperature (T), the pressure (P) and, in the case of a fuel volume sensor, the fuel mixture (C is 40% lower in pure butane than in air). Thus, for a vehicle fuel volume sensor application, the dependence of the volume measurement on the speed of sound may under some circumstances decrease the accuracy of the sensor. To address this concern, the sensor may include a means for calibration of the speed of sound in the tank. Such a calibration means is illustrated in FIG. 9, which shows a direct driven resonant sensor with a calibration apparatus.

Figure 9:
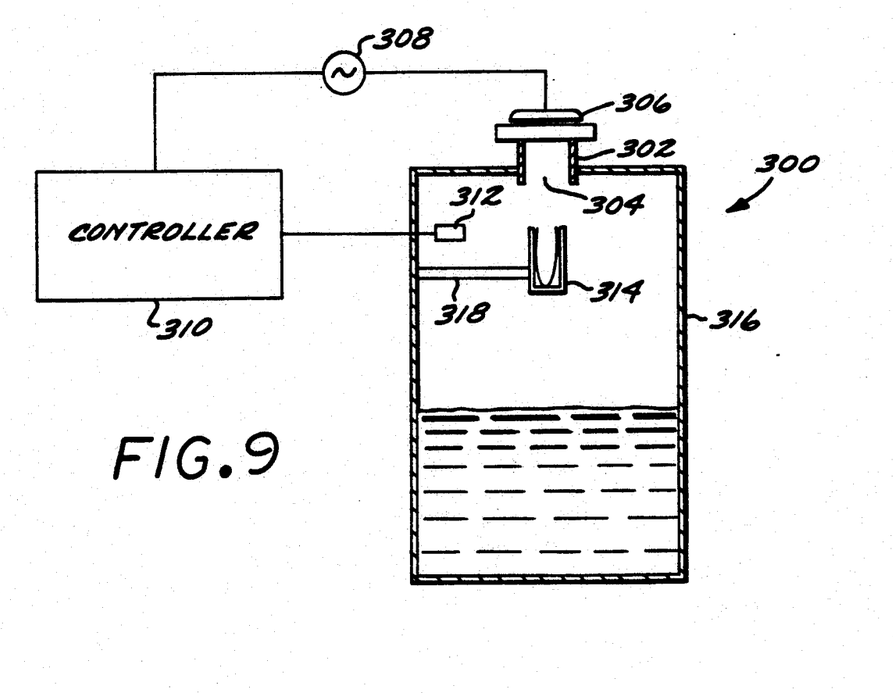
FIG. 9 illustrates a fourth alternate embodiment of the invention including an apparatus for determining the speed of sound in the tank.

In FIG. 9, the sensor system 300 includes a pipe 302 coupling the aperture 304 in the tank 316 to the transducer 306. A sine wave generator 308 is controlled by controller 310 to drive the transducer 306 throughout the range of Helmholtz frequencies, and the acoustic response is measured by the microphone 312. The controller 310 determines the resonant frequency and corresponding volume in the same manner as discussed above with respect to the system of FIG. 5, except that a separate microphone is used to record the acoustic response, rather than using the current through the exciting transducer for this purpose. The calibration system comprising system 300 includes a tube 314 placed somewhat in front of the aperture 304 which has a known resonant frequency under some predetermined nominal conditions. The dimensions of the tube 314 are selected so that its resonant frequency is substantially higher than the resonant frequency of the air cavity in the tank 316. By measuring the actual resonant frequency of the tube 314 and comparing the measured frequency with the nominal resonant frequency, the actual speed of sound within the air cavity may be calibrated and used as a reference for the Helmholtz resonant frequency measurements. To measure the actual resonant frequency of the tube 314, the same transducers 306 and 312 are used, and the exciting frequency regime of the sine wave generator 308 is changed to measure the resonant frequency of the tube 314. At the higher frequency regime, e.g., on the order of 600 to 1200 Hz, as compared to a typical Helmholtz resonant frequency regime of 20-300 Hz, the sensor system 300 will essentially measure the resonant frequency of the tube 314. The length of the tube 314 may be selected to be a ¼ wavelength, with the tube having a closed end. Another alternative is to use an open tube with a length of ½ wavelength at the resonant frequency. The tube 314 is supported in place by bracket 318 in this illustrative embodiment.

Once the actual speed of sound within the air cavity has been calibrated, the controller 310 may use the calibrated value to adjust its calculations of the air volume, thereby improving the accuracy of the volume measurement. By way of example only, the controller may include a plurality of lookup tables, each correlating particular Helmholtz resonant frequencies to corresponding volumes for a given speed of sound. Recalibration of the speed of sound periodically by the system 300 can result in different lookup tables being accessed, as the speed of sound changes.

It is understood that the above-described embodiments are merely illustrative of the possible specific embodiments which may represent principles of the present invention. Other arrangements may readily be devised in accordance with these principles by those skilled in the art without departing from the scope of the invention.

What is claimed is:

1. An apparatus for measuring the volume of a substance in a cavity within a container, comprising:
   means for acoustically exciting said cavity at one or more excitation frequencies within a first frequency range;
   means for providing a cavity response signal indicative of the acoustic response of said cavity within the container to the acoustic excitation signals;
   means for calibrating said apparatus to the speed of sound within said cavity and for providing a volume signal indicative of the volume of substance within said container, comprising:
   an auxiliary chamber of known volume disposed within said cavity so as to be above the level of said substance within said cavity, said chamber having a known resonant frequency when the speed of sound propagation in said chamber is at a predetermined nominal value, said known resonant frequency of said auxiliary chamber being higher than a resonant frequency of said cavity, said chamber exposed to the atmosphere within said container so that the actual resonant frequency of said chamber will be dependent on the actual speed of sound propagation through said atmosphere;
   means for acoustically exciting said chamber at excitation frequencies within a second frequency range distinct from said first frequency range;
   means for providing a chamber response signal indicative of the acoustic response of the chamber to said chamber excitation signals; and
   processing means responsive to said cavity response signal and to said chamber response signal for providing a volume signal compensated for the actual speed of sound propagation within said cavity and indicative of the volume of substance within said cavity.

2. The apparatus of claim 1 wherein said chamber comprises a tube closed at one end thereof.

3. The apparatus of claim 2 wherein said tube has a length of one quarter wavelength at said known resonant frequency of said chamber.

4. The apparatus of claim 1 wherein said chamber comprises a tube open at each end thereof and having a length of one half wavelength at said known resonant frequency of said chamber.

5. The apparatus of claim 1 wherein said means for acoustically exciting said cavity comprises a first transducer communicating with said cavity, said auxiliary chamber is disposed within range of acoustic energy generated by said first transducer, wherein said means for acoustically exciting said chamber comprises said first transducer, and wherein said means for providing a cavity response signal comprises a second transducer disposed in communication with said cavity, and said means for providing a chamber response signal comprises said second transducer.

6. The apparatus of claim 5 wherein said first transducer communicates with said cavity via an opening formed in a top wall defining said container, and said chamber is disposed directly below said opening and spaced from said opening.

7. The apparatus of claim 6 wherein said auxiliary chamber comprises a tube closed at one end thereof, said tube having a length of one quarter wavelength at said known resonant frequency of said chamber.

8. The apparatus of claim 1 wherein said resonant frequency of said cavity is in the range of 20–300 Hz, and said resonant frequency of said auxiliary chamber is in the range of 600–1200 Hz.

* * * * *